No. 835,695. PATENTED NOV. 13, 1906.
E. WILKE.
ATTACHMENT FOR PLOWS.
APPLICATION FILED JUNE 1, 1906.
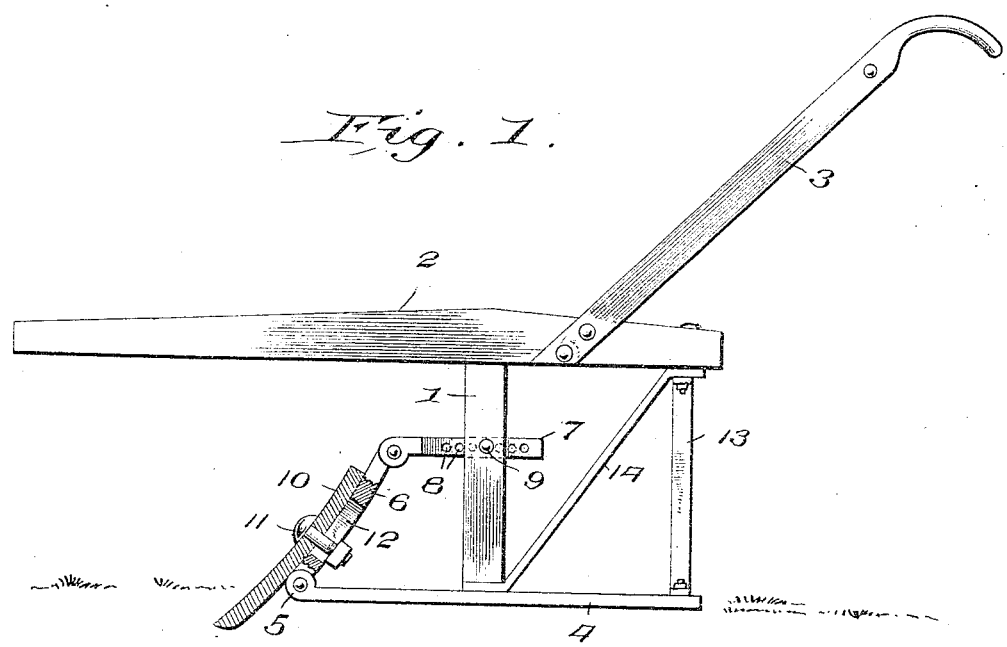
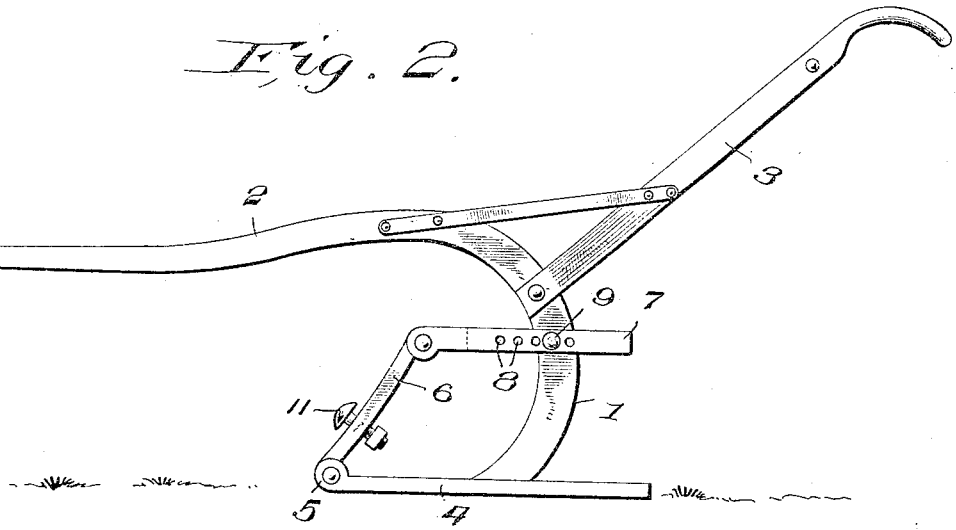
Witnesses
Thos. W. Riley
E. F. Gill
Inventor
E. Wilke
By W. J. Fitzgerald & Co.
Attorneys

UNITED STATES PATENT OFFICE.

ERNEST WILKE, OF CAT SPRING, TEXAS.

ATTACHMENT FOR PLOWS.

No. 835,695.      Specification of Letters Patent.      Patented Nov. 13, 1906.

Application filed June 1, 1906. Serial No. 319,761.

*To all whom it may concern:*

Be it known that I, ERNEST WILKE, a citizen of the United States, residing at Cat Spring, in the county of Austin and State of Texas, have invented certain new and useful Improvements in Attachments for Plows; and I do hereby declare the following to be a full, clear, and exact description of the invention, such as will enable others skilled in the art to which it appertains to make and use the same.

My invention relates to new and useful improvements in attachments for plows, and my object is to provide means whereby the pitch of the moldboard or shovel may be regulated as desired.

A further object is to provide means for adjusting the moldboard whereby the depth of the furrow may be regulated.

Other objects and advantages will be hereinafter referred to, and more particularly pointed out in the claim.

In the accompanying drawings, which are made a part of this application, Figure 1 is a side elevation of a plow-stock, showing my improved attachment secured thereto, parts thereof being in sections; and Fig. 2 is a similar view showing the device applied to use upon a metal stock.

Referring to the drawings, in which similar reference-numerals designate corresponding parts throughout the several views, 1 indicates a post, to the upper end of which is secured a beam 2, said beam and post being of the usual or any preferred form, the beam being provided at one end with the usual form of controlling-handles 3.

Secured to the lower end of the post 1 in any preferred manner is a bar 4, said bar having ears 5 at its forward end, to which is pivotally secured a shank 6, and to the upper end of which is pivotally secured an adjusting-arm 7, said arm being provided with a plurality of openings 8 throughout its length, with which is adapted to engage a bolt 9 and by which means the arm is adjustably secured to the post 1.

The moldboard 10 is adapted to be secured to the shank 6 by means of the securing-bolt 11, said bolt being directed through the moldboard and through an elongated slot 12 in the shank 6, thereby providing means for adjusting the moldboard upon the shank, whereby the depth of the furrow may be regulated.

When my improved device is used in connection with a plow having a wooden post and beam, the rear end of bar 4 is reinforced by means of brace members 13 and 14, said braces extending from the rear end of the beam 2 into connection with the bar 4. When a metal beam and post are used, as shown in Fig. 2 of the drawings, the braces 13 and 14 are dispensed with and the adjusting-arm 7 is bifurcated, the beam 1 being received in the bifurcated end of the arm. By this construction it will be seen that I have provided a device that may be used in cultivating any kind of soil, the main object being to so regulate the pitch of the moldboard that the same will clear itself of all trash or the like and will freely scour in all kinds of soil.

What I claim is—

The combination with the post of a plow; of a horizontally-disposed bar rigid with the lower end of said post and extending at a distance on each side thereof, upwardly-extending curved ears at the forward end of said bar, a shank pivoted at one end between said ears, an arm having a plurality of openings therein adapted to successively register with an opening in the beam, downwardly-extending curved ears at one end of said arm between which is adapted to be pivotally secured the upper end of said shank, a moldboard and a bolt adapted to take through said moldboard and through an elongated slot in said shank and between its pivoted points whereby the moldboard may be adjusted on said shank.

In testimony whereof I have signed my name to this specification in the presence of two subscribing witnesses.

ERNEST WILKE.

Witnesses:
     C. THEUMAN,
     H. BRAESICKE.